(12) United States Patent
Banerjee et al.

(10) Patent No.: US 12,732,349 B2
(45) Date of Patent: Sep. 8, 2026

(54) POST QUANTUM KEY ENCAPSULATION MECHANISM BASED SUCI ENCRYPTION

(71) Applicant: Nokia Technologies Oy, Espoo (FI)

(72) Inventors: Aritra Banerjee, Munich (DE); Ranganathan Mavureddi Dhanasekaran, Munich (DE); K Tirumaleswar Reddy, Bangalore (IN); Saurabh Khare, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 82 days.

(21) Appl. No.: 18/758,392

(22) Filed: Jun. 28, 2024

(65) Prior Publication Data

US 2025/0038969 A1 Jan. 30, 2025

(30) Foreign Application Priority Data

Jul. 27, 2023 (IN) ............................. 202311050790

(51) Int. Cl.
*H04L 9/08* (2006.01)

(52) U.S. Cl.
CPC .......... *H04L 9/0852* (2013.01); *H04L 9/0825* (2013.01)

(58) Field of Classification Search
CPC .... H04L 9/0852; H04L 9/0825; H04L 9/0866
See application file for complete search history.

(56) References Cited

U.S. PATENT DOCUMENTS

| | | | | |
|---|---|---|---|---|
| 2021/0021993 | A1* | 1/2021 | Yang | H04W 12/0433 |
| 2021/0092603 | A1* | 3/2021 | Yang | H04L 9/0844 |
| 2021/0409214 | A1* | 12/2021 | Nix | H04L 9/085 |
| 2022/0209950 | A1* | 6/2022 | Gray | H04L 9/3263 |
| 2023/0361994 | A1* | 11/2023 | Nix | H04L 9/085 |
| 2024/0106636 | A1* | 3/2024 | Nix | H04L 9/0852 |

OTHER PUBLICATIONS

"3rd Generation Partnership Project; Technical Specification Group Core Network and Terminals; Non-Access-Stratum (NAS) protocol for 5G System (5GS); Stage 3; (Release 18)", 3GPP TS 24.501, V18.3.0, Jun. 2023, pp. 1-1114.

"3rd Generation Partnership Project, Technical Specification Group Services and System Aspects; Generic Authentication Architecture (GAA); Generic Bootstrapping Architecture (GBA) (Release 18)", 3GPP TS 33.220, V18.0.0, Jun. 2023, pp. 1-104.

(Continued)

*Primary Examiner* — Baotran N To
(74) *Attorney, Agent, or Firm* — Lippes Mathias LLP

(57) ABSTRACT

Example embodiments of the present disclosure relate to SUCI encryption based on a post quantum key encapsulation mechanism. In an aspect, a terminal device generates a subscription concealed identifier (SUCI) of the terminal device based on a subscription permanent identifier (SUPI) of the terminal device and a public key of a home network of the terminal device, wherein the public key is generated based on a post quantum cryptography (PQC) key encapsulation mechanism (KEM). The terminal device then transmits the SUCI to a network device. According to some embodiments of the present disclosure, a new fully Post Quantum based SUCI ensures to avoid different kinds of attacks.

8 Claims, 8 Drawing Sheets

610

Generate a subscription concealed identifier (SUCI) of the terminal device based on a subscription permanent identifier (SUPI) of the terminal device and a public key of a home network of the terminal device, wherein the public key is generated based on a post quantum cryptography (PQC) key encapsulation mechanism (KEM)

620

Transmit the SUCI to a network device

(56) References Cited

OTHER PUBLICATIONS

"3rd Generation Partnership Project; Technical Specification Group Services and System Aspects; System architecture for the 5G System (5GS), Stage 2 (Release 18)", 3GPP TS 23.501, V18.2.1, Jun. 2023, pp. 1-694.

"3rd Generation Partnership Project, Technical Specification Group Core Network and Terminals; Numbering, addressing and identification; (Release 18)", 3GPP TS 23.003, V18.2.0, Jun. 2023, pp. 1-155.

"3rd Generation Partnership Project; Technical Specification Group Services and System Aspects; Security architecture and procedures for 5G system (Release 18)", 3GPP TS 33.501, V18.2.0, Jun. 2023, pp. 1-308.

Dekok, "The Network Access Identifier", RFC 7542, Internet Engineering Task Force (IETF), May 2015, pp. 1-30.

* cited by examiner

POST QUANTUM KEY ENCAPSULATION MECHANISM BASED SUCI ENCRYPTION

FIELD

Example embodiments of the present disclosure generally relate to the field of communications, and in particular, to a terminal device, a network device, methods, apparatuses, and a computer-readable storage medium for post quantum key encapsulation mechanism based SUCI encryption.

BACKGROUND

Communication security is crucial for any communication systems including 5G systems. Appropriate encryption encapsulation schemes play an important role in communication security. The 3rd Generation Partnership Project, 3GPP is committed to developing secure communication systems. There are still challenges in how to ensure communication security.

SUMMARY

In general, example embodiments of the present disclosure provide a solution for SUCI encryption based on a post quantum key encapsulation mechanism.

In a first aspect, there is provided a terminal device. The terminal device comprises at least one processor and at least one memory storing instructions that, when executed by the at least one processor, cause the terminal device at least to: generate a subscription concealed identifier (SUCI) of the terminal device based on a subscription permanent identifier (SUPI) of the terminal device and a public key of a home network (HN) of the terminal device, wherein the public key is generated based on a post quantum cryptography (PQC) key encapsulation mechanism (KEM); and transmit the SUCI to a network device.

In a second aspect, there is provided a network device. The network device comprises at least one processor and at least one memory storing instructions that, when executed by the at least one processor, cause the network device at least to: receive a subscription concealed identifier (SUCI) of a terminal device; and obtain a subscription permanent identifier (SUPI) of the terminal device based on the SUCI of the terminal device and a private key of a home network of the terminal device, wherein the private key is generated based on a post quantum cryptography (PQC) key encapsulation mechanism (KEM).

In a third aspect, there is provided a method. The method comprises: generating, at a terminal device, a subscription concealed identifier (SUCI) of the terminal device based on a subscription permanent identifier (SUPI) of the terminal device and a public key of a home network of the terminal device, wherein the public key is generated based on a post quantum cryptography (PQC) key encapsulation mechanism (KEM); and transmitting the SUCI to a network device.

In a fourth aspect, there is provided a method. The method comprises: receiving, at a network device, a subscription concealed identifier (SUCI) of a terminal device; and obtaining a subscription permanent identifier (SUPI) of the terminal device based on the SUCI of the terminal device and a private key of a home network of the terminal device, wherein the private key is generated based on a post quantum cryptography (PQC) key encapsulation mechanism (KEM).

In a fifth aspect, there is provided an apparatus. The apparatus comprises: means for generating, at a terminal device, a subscription concealed identifier (SUCI) of the terminal device based on a subscription permanent identifier (SUPI) of the terminal device and a public key of a home network of the terminal device, wherein the public key is generated based on a post quantum cryptography (PQC) key encapsulation mechanism (KEM); and means for transmitting the SUCI to a network device.

In an sixth aspect, there is provided an apparatus. The apparatus comprises: means for receiving, at a network device, a subscription concealed identifier (SUCI) of a terminal device; and means for obtaining a subscription permanent identifier (SUPI) of the terminal device based on the SUCI of the terminal device and a private key of a home network of the terminal device, wherein the private key is generated based on a post quantum cryptography (PQC) key encapsulation mechanism (KEM).

In a seventh aspect, there is provided a non-transitory computer-readable storage medium comprising instructions. The instructions, when executed by an apparatus, cause the apparatus to perform at least the following: generating, at a terminal device, a subscription concealed identifier (SUCI) of the terminal device based on a subscription permanent identifier (SUPI) of the terminal device and a public key of a home network of the terminal device, wherein the public key is generated based on a post quantum cryptography (PQC) key encapsulation mechanism (KEM); and transmitting the SUCI to a network device.

In an eighth aspect, there is provided a non-transitory computer-readable storage medium comprising instructions. The instructions, when executed by an apparatus, cause the apparatus to perform at least the following: receiving, at a network device, a subscription concealed identifier (SUCI) of a terminal device; and obtaining a subscription permanent identifier (SUPI) of the terminal device based on the SUCI of the terminal device and a private key of a home network of the terminal device, wherein the private key is generated based on a post quantum cryptography (PQC) key encapsulation mechanism (KEM).

In a ninth aspect, there is provided a computer program comprising instructions, which, when executed by an apparatus, cause the apparatus at least to: generate a subscription concealed identifier (SUCI) of the terminal device based on a subscription permanent identifier (SUPI) of the terminal device and a public key of a home network of the terminal device, wherein the public key is generated based on a post quantum cryptography (PQC) key encapsulation mechanism (KEM); and transmit the SUCI to a network device.

In a tenth aspect, there is provided a computer program comprising instructions, which, when executed by an apparatus, cause the apparatus at least to: receive a subscription concealed identifier (SUCI) of a terminal device; and obtain a subscription permanent identifier (SUPI) of the terminal device based on the SUCI of the terminal device and a private key of a home network of the terminal device, wherein the private key is generated based on a post quantum cryptography (PQC) key encapsulation mechanism (KEM).

In an eleventh aspect, there is provided a terminal device. The terminal device comprises: generating circuitry configured to generate a subscription concealed identifier (SUCI) of the terminal device based on a subscription permanent identifier (SUPI) of the terminal device and a public key of a home network of the terminal device, wherein the public key is generated based on a post quantum cryptography (PQC) key encapsulation mechanism (KEM); and transmitting circuitry configured to transmit the SUCI to a network device.

In a twelfth aspect, there is provided a network device. The network device comprises: receiving circuitry configured to receive a subscription concealed identifier (SUCI) of a terminal device; and obtaining circuitry configured to obtain a subscription permanent identifier (SUPI) of the terminal device based on the SUCI of the terminal device and a private key of a home network of the terminal device, wherein the private key is generated based on a post quantum cryptography (PQC) key encapsulation mechanism (KEM).

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar elements.

DETAILED DESCRIPTION

Figure 1A:
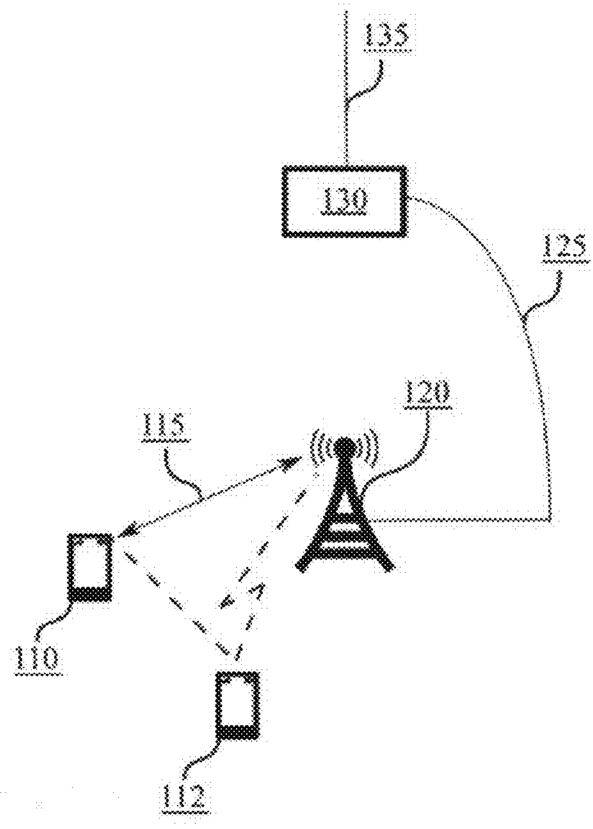
FIG. 1A illustrates an example of a network environment in which some example embodiments of the present disclosure may be implemented.

Principles of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the fourth generation (4G), 4.5G, the fifth generation (5G) communication protocols, sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "access network device" refers to a node in a communication network via which a terminal device accesses the network and receives services therefrom. The network device may refer to a base station (BS) or an access point (AP), for example, a node B (NodeB or NB), an evolved NodeB (cNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology. In the following description, the terms "access network device" and "access network node" may be used interchangeably.

The term "core network device" or "CN device" refers to a device capable of communicating with the access network device and providing services to the terminal device in a core network. Examples of the core network device may include Mobile Switching Centers (MSCs), Mobility Management Entities (MMEs), Access and Mobility Management Functions (AMFs), Operation and Management (O&M) nodes, Operation Support System (OSS) nodes, Self-Organization Network (SON) nodes, positioning nodes, such as Enhanced Serving Mobile Location Centers (E-SMLCs). In other embodiments, the core network device may be any other suitable application or entity in a core network.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Reference is first made to FIG. 1A, which illustrates an example of communication system in which some example embodiments of the present disclosure may be implemented. According to the example scenario of FIG. 1A, there is a cellular communication system, which comprises first and second User Equipment UE 110, 112, one or more Base Stations, BS, 120, and core network element 130. The first UE 110 is connected to the BS 120 via an air interface 115. The BS 120 may be connected, directly or via at least one intermediate node, with the core network 130 via the interface 125. The core network 130 may be, in turn, coupled via the interface 135 with another network (not shown in FIG. 1A), via which connectivity to further networks may be obtained, for example via a worldwide interconnection network. In case of 4G, the core network 130 may be referred to as an Evolved Packet Core, EPC, and in case of 5G, the core network 130 may be referred to as a 5G Core, 5GC. In any case, embodiments of the present disclosure are not restricted to any particular cellular communication technology.

The core network 130 may comprise more than one Public Land Mobile Network, PLMN, each equipped with at least one network function (NF). The NF may refer to an operational and/or a physical entity. The NF may be a specific network node or element, or a specific function or a set of functions carried out by one or more entities, such as a virtual NF. At least some example embodiments of the present disclosure may be applied in containerized or compartmentalized deployments as well. One physical node may be configured to perform tasks of multiple NFs.

In FIG. 1A, the first UE 110 or a subscription module hosted by the first UE 110 may be the legitimate subscriber while the second UE 112 may be the attacker. For example, as an attacker, the second UE 112 may steal the identifier of the first UE 110 to perform communications, which is not desired. A unique international mobile subscription identity (IMSI) shall be allocated to each mobile subscriber in the GSM/UMTS/EPS system.

Subscription permanent identifier (SUPI) is a globally unique 5G subscription permanent identifier allocated to each subscriber in the 5G System. SUCI is a privacy preserving identifier containing the concealed SUPI. Traditionally, the concealment of the SUPI is based on elliptic curve integrated encryption scheme (ECIES). The use of ECIES for concealment of the SUPI shall adhere to the standards for efficient cryptography group (SECG) specifications. Processing on UE side and home network side are described in high level in the details later.

Figure 9:
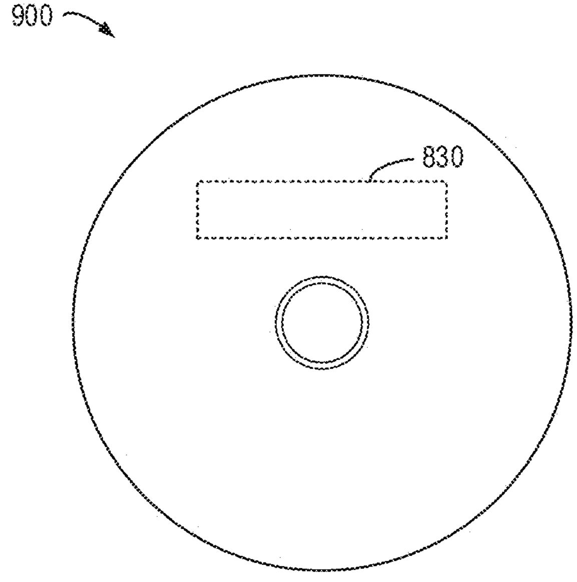
FIG. 9 illustrates a block diagram of an example of a computer-readable medium in accordance with some example embodiments of the present disclosure.

When the SUPI is of type IMSI, the subscription identifier part of the IMSI (i.e., mobile subscriber identification number (MSIN)) that is used to construct the scheme-input shall be coded as hexadecimal digits using packed BCD coding where the order of digits within an octet is same as the order of MSIN digits specified in Figure 9.11.3.4.3a of TS 24.501. If the MSIN is composed of an odd number of digits, then the bits 5 to 8 of final octet shall be coded as "1111". When the SUPI is of type network specific identifier, the subscription identifier part of the SUPI that is used to construct the scheme-input shall follow the encoding rules specified in Annex B.2.1.2 of TS 33.220.

Figure 1B:
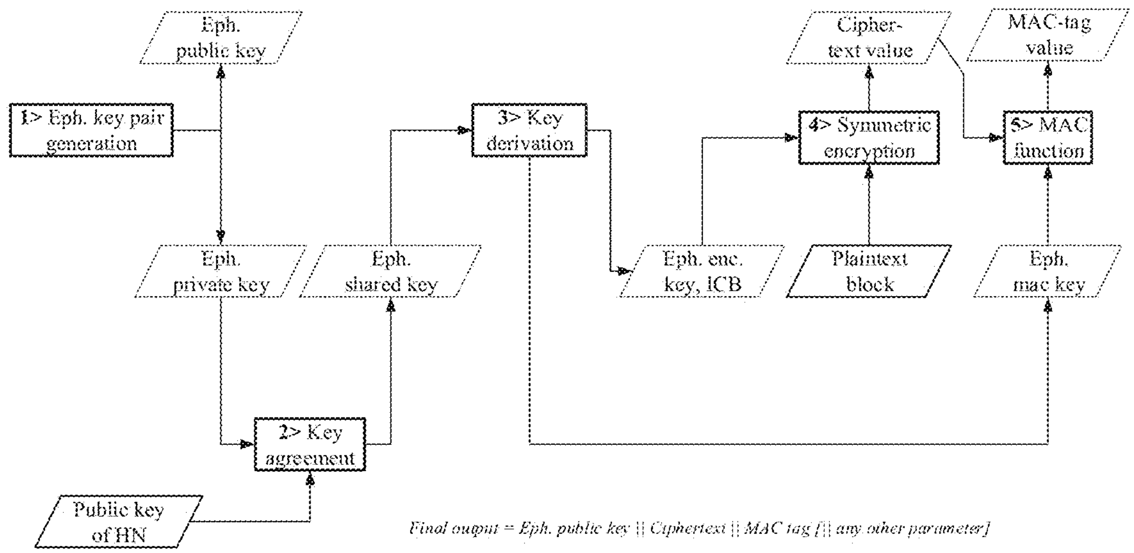
FIG. 1B illustrates encryption steps at UE side according to an Elliptic Curve Integrated Encryption Scheme (ECIES) scheme.

FIG. 1B illustrates encryption steps at UE side according to an ECIES scheme. The ECIES scheme shall be implemented such that for computing a fresh SUCI and the UE shall use the provisioned public key of the home network and freshly generated ECC (elliptic curve cryptography) ephemeral public/private key pair according to the ECIES parameters provisioned by home network. The processing on UE side shall be done according to encryption operations, which comprises: generating keying data K of length enckeylen+icblen+mackeylen; parsing the leftmost enckeylen octets of K as an encryption key EK, the middle icblen octets of K as an ICB, and the rightmost mackeylen octets of K as a MAC key MK. The final output of the ECIES concealment scheme shall be the concatenation of the ECC ephemeral public key, the ciphertext value, the MAC tag value, and any other parameters, if applicable. It is noted that the reason for mentioning "any other parameter, if applicable" in the final output is to allow cases, e.g., to enable the sender to send additional sign indication when point compression is used.

Figure 1C:
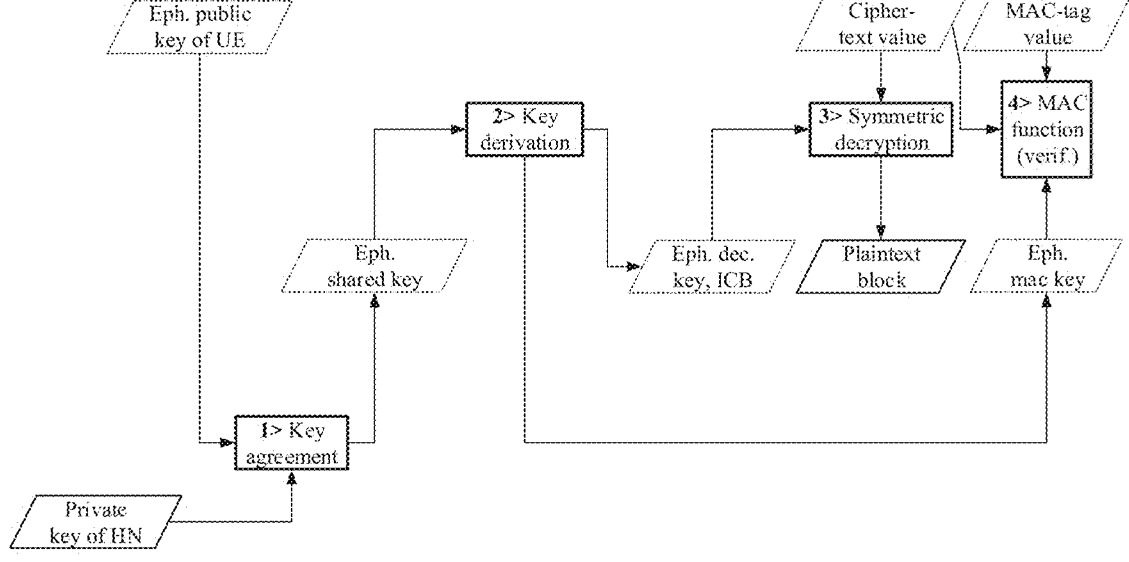
FIG. 1C illustrates encryption steps at network side according to the ECIES scheme.

FIG. 1C illustrates, according to the ECIES scheme, encryption steps at home network side, specifically, at an NF in the core network, such as subscription identifier de-concealing function (SIDF). The ECIES scheme shall be implemented such that for de-concealing a SUCI and the home network shall use the received ECC ephemeral public key of the UE and a private key of the home network for the UE. The processing on home network side shall be done according to decryption operations, which comprises: generating keying data K of length enckeylen+icblen+mackeylen; parsing the leftmost enckeylen octets of K as an encryption key EK, the middle icblen octets of K as an ICB, and the rightmost mackeylen octets of K as a MAC key MK. It is noted that unlike the UE, the home network does not need to perform a fresh ephemeral key pair generation for each decryption. How often the home network generates new public/private key pair and how the public key is provisioned to the UE are out of the scope of the present disclosure.

Figure 1D:
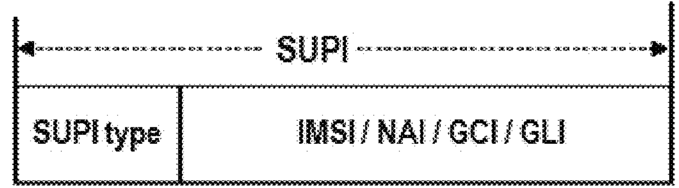
FIG. 1D illustrates the SUPI defined in 3GPP TS 23.003 clause 2.2A.

As mentioned above, the SUPI is a globally unique 5G Subscription Permanent Identifier allocated to each subscriber in the 5G System. The SUPI is defined in clause 5.9.2 of 3GPP TS 23.501. As shown in FIG. 1D, the SUPI is defined as including "SUPI type" and "IMSI/NSI/GLI/GCI". The "SUPI type" may indicate an IMSI, a network specific identifier (NSI), a global line identifier (GLI) or a global cable identifier (GCI). Dependent on the value of the "SUPI type", "IMSI/NSI/GLI/GCI" may be an IMSI as defined in clause 2.1 of TS 23.003, an NSI taking the form of a network access identifier (NAI) as defined in clause 28.7.2 of TS 23.003, a GCI taking the form of a NAI as defined in clause 28.15.2 of TS 23.003, or a GLI taking the form of an NAI as defined in clause 28.16.2 of TS 23.003.

As also mentioned above, the SUCI is a privacy preserving identifier containing the concealed SUPI. The SUCI is defined in clause 6.12.2 of 3GPP TS 33.501. It is noted that depending on the protocol used to convey the SUPI, the SUPI type can take different formats.

Figure 1E:
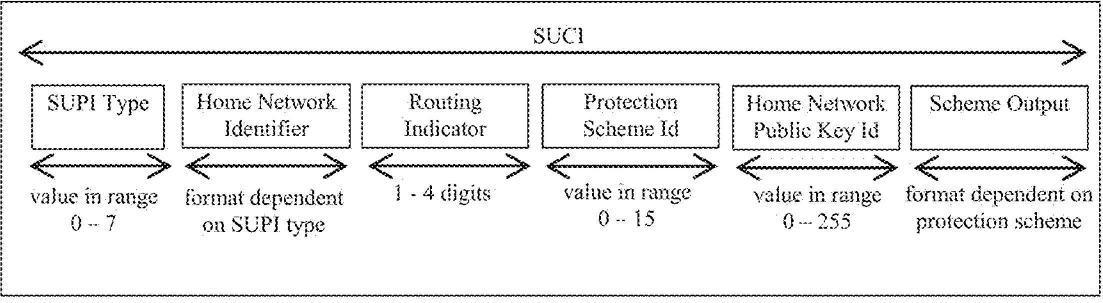
FIG. 1E illustrates the SUCI according to the current specification.

As shown in FIG. 1E, the SUCI according to the specification is composed of the following parts. A first part is SUPI Type, consisting in a value in the range 0 to 7. It identifies the type of the SUPI concealed in the SUCI. The following values are defined: 0 for IMSI, 1 for NSI, 2 for GLI, 3 for GCI, 4 to 7 for spare values for future use.

A second part is Home Network Identifier, identifying the home network of the subscriber. When the SUPI Type is an IMSI, the Home Network Identifier is composed of two parts: mobile country code (MCC), consisting of three decimal digits; and mobile network code (MNC), consisting of two or three decimal digits. The MCC identifies uniquely the country of domicile of the mobile subscription. The MNC identifies the home PLMN or SNPN of the mobile subscription. When the SUPI type is a Network Specific Identifier (NSI), a GLI or a GCI, the Home Network Identifier consists of a string of characters with a variable length representing a domain name as specified in clause 2.2 of IETF RFC 7542. For a GLI or a GCI, the domain name shall correspond to the realm part specified in the NAI format for SUPI in clauses 28.15.2 and 28.16.2.

A third part is Routing Indicator, consisting of 1 to 4 decimal digits assigned by the home network operator and provisioned in the USIM, that allow together with the Home Network Identifier to route network signaling with SUCI to AUSF and UDM instances capable to serve the subscriber. Each decimal digit present in the Routing Indicator shall be regarded as meaningful (e.g., value "012" is not the same as value "12"). If no routing indicator is configured on the USIM, this data field shall be set to the value 0 (i.e., only consist of one decimal digit of "0").

A fourth part is Protection Scheme Identifier, consisting in a value in the range of 0 to 15 (see Annex C.1 of 3GPP TS 33.501). It represents the null scheme, or a non-null scheme specified in Annex C of 3GPP TS 33.501, or a protection scheme specified by the HPLMN; the null scheme shall be used if the SUPI type is a GLI or GCI.

A fifth part is Home Network Public Key Identifier, consisting in a value in the range 0 to 255. It represents a public key provisioned by the HPLMN or SNPN and it is used to identify the key used for SUPI protection. This data field shall be set to the value 0 if and only if null protection scheme is used.

A sixth part is Scheme Output, consisting of a string of characters with a variable length or hexadecimal digits, dependent on the used protection scheme. It represents the output of a public key protection scheme specified in Annex C of 3GPP TS 33.501 or the output of a protection scheme specified by the HPLMN.

According to the specification, the scheme output is formatted as a variable length of characters as specified for the username in clause 2.2 of IETF RFC 7542. It is noted that if the null protection scheme is used, the NFs can derive SUPI from SUCI when needed. The AMF derives SUPI used for AUSF discovery from SUCI when the Routing-Indicator is zero and the protection scheme is null. For an anonymous SUCI, an NF can derive an anonymous SUPI from an anonymous SUCI when needed; this is, the NF can derive a SUPI in NAI format for which the "username" part of the SUPI is "anonymous" or omitted.

Figure 1F:
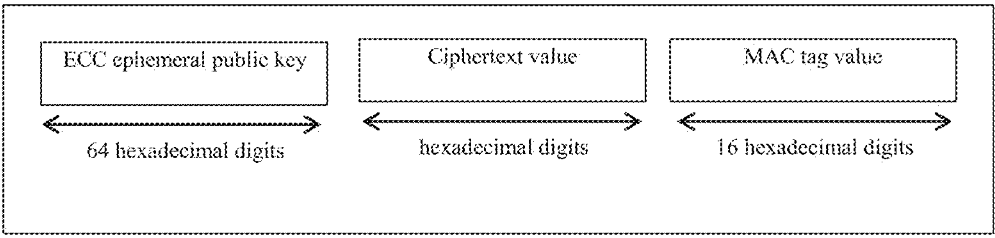
FIG. 1F illustrates the scheme output for the ECIES scheme.

FIG. 1F shows the scheme output for the elliptic curve integrated encryption scheme (ECIES) profile A. Other profiles like scheme output for the Elliptic Curve Integrated Encryption Scheme Profile B could be referenced in TS 23.003 figure 2.2B-4. The challenge in ECIES scheme is that cryptographically relevant quantum computers (CRQCs)

can break elliptic curve algorithms which are used in the conventional SUCI encryption scheme (i.e., ECIES).

In particular, quantum computers pose a threat of using only the home network (HN) public key using Shor's algorithm one can easily get SUPI from SUCI. This situation arises because CRQCs using Shor's algorithm can break elliptic curve algorithms which are used in the conventional SUCI encryption scheme. So, CRQCs pose a threat of an attacker using only the home network's public key and Shor's algorithm to easily get SUPI from SUCI. Thus, it would render the encryption scheme vulnerable as the whole concept is based on someone not being able to crack the HN private key from the HN public key. Unfortunately, CRQCs using Shor's algorithm can break elliptic curve algorithms which are use. Therefore, a solution is required for this PQC migration for SUCI. Some embodiments of the present disclosure are applicable after the transition from hybrid encryption scheme to only use PQC KEM.

It can be seen the conventional SUCI encryption mechanism uses elliptic curves based on the discrete logarithm problem which makes it vulnerable. In this attack the adversary can collect your HN public key and leveraging a CRQC (Cryptographically Relevant Quantum Computer) can gain access to the HN private key. And if the adversary gains access to the HN private key, it makes it straightforward to break the SUCI encryption to get SUPI.

In view of above discussions and analysis, some embodiments of the present disclosure provide a solution with network supporting PQC migration options and defining a new SUCI type. At UE side, PQC KEM public key of HN is used in Key encapsulation mechanism to generate ciphertext and shared secret. This shared secret is used as an input to Key Derivation Function (KDF) to generate an encryption key to generate cipher text of SUPI and MAC value. At SIDF side, the received PQC KEM cipher text (included in the received SUCI) is used along with the PQC KEM Secret key of HN (stored in SIDF itself) to decapsulate and generate the shared secret which is then used as an input to KDF to generate the decryption key to decipher the cipher text (included in the received SUCI) and verify the MAC (included in the received SUCI).

According to some embodiments of the present disclosure, the new fully Post Quantum based SUCI ensures to avoid different kinds of attacks, like Shor's algorithm attack on asymmetric cryptography methods based on prime factorization or discrete logarithm problem (finite field or elliptic curve). It is noted that some embodiments of the present disclosure have removed the traditional UE Ephemeral key generation and usage to produce the Ephemeral shared key in UE and SIDF. New SUCI type or old SUCI type will be helpful during the migration. SUCI type can be readable to any NF (like UDM). Accordingly, it applies de-concealing via ARPF.

Figure 2:
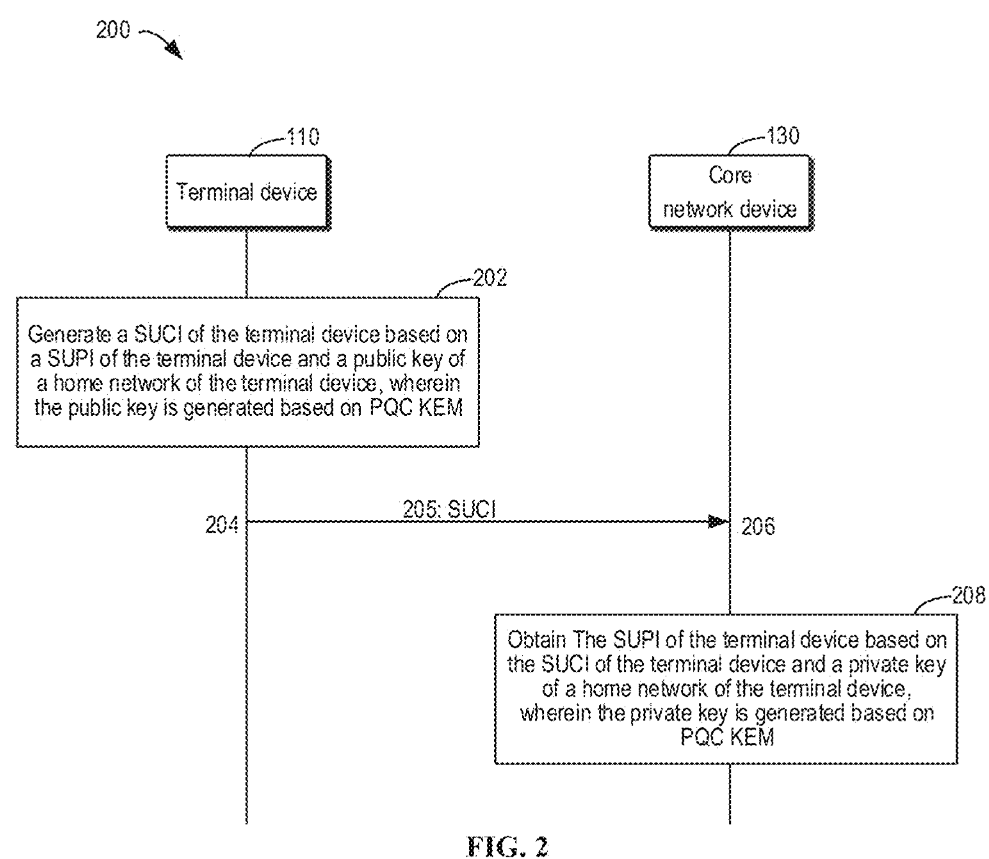
FIG. 2 illustrates a flowchart illustrating a communication process in accordance with some example embodiments of the present disclosure.

FIG. 2 illustrates a flowchart illustrating a communication process 200 in accordance with some example embodiments of the present disclosure. For the purpose of discussion, the communication process 200 will be described with reference to FIGS. 1A-IF. It would be appreciated that although the communication process 200 has been described referring to the network environment 100 of FIG. 1A, this communication process 200 may be likewise applied to other similar communication scenarios.

As shown in FIG. 2, a terminal device 110 generates 202 a subscription concealed identifier (SUCI) of the terminal device 110 based on a subscription permanent identifier (SUPI) of the terminal device 110 and a public key of a home network of the terminal device, wherein the public key is generated based on a post quantum cryptography (PQC) key encapsulation mechanism (KEM). Herein the public key may also be referred as "PQC KEM public key". Then the terminal device 110 transmits 204 the SUCI 205 to a network device 130, e.g., for a registration. For instance, the network device 130 may be or comprise an NF in the core network, such as subscription identifier de-concealing function (SIDF). In some embodiments, the network device 130 may reside at a unified data management (UDM) network function or an authentication server function, AUSF, or any other future network function in the core network.

Correspondingly, the network device 130 receives 206 the SUCI 205 of the terminal device 110, and obtains 208 the SUPI of the terminal device 110 based on the received SUCI 205 of the terminal device 110 and a private key of the home network of the terminal device 110, wherein the private key is generated based on a post quantum cryptography (PQC) key encapsulation mechanism (KEM).

Figure 3:
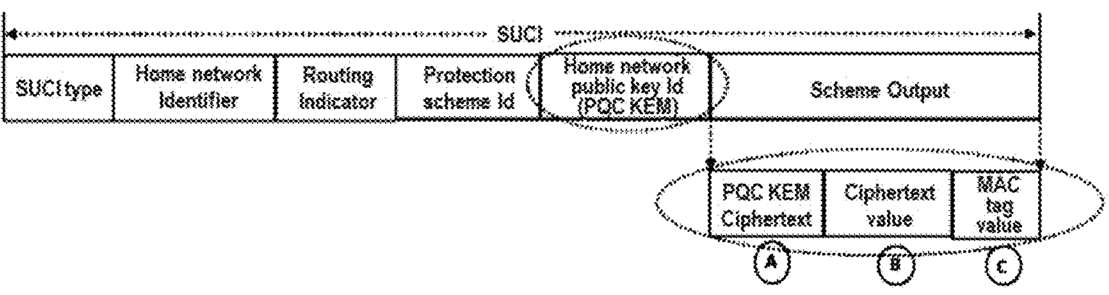
FIG. 3 illustrates schematically the newly defined SUCI type according to some embodiments of the present disclosure.

As mentioned above, for addressing attack issues in ECIES based SUCI scheme, some embodiments of the present disclosure provide a solution with network supporting PQC migration options and defines a new SUCI type. FIG. 3 schematically shows the newly defined SUCI type according to some embodiments of the present disclosure. The new SUCI comprises "Home Network Public Key Identifier (PQC KEM)" consisting in a value in the range 0 to 255, representing a public key provisioned by the HPLMN or SNPN and being used to identify the key used for SUPI protection apart from traditional HN public key. Example of the PQC KEM Public key is Kyber (selected by NIST standards). There are several other key encapsulation methods like BIKE, HQC, classic McEliece. The new SUCI further comprises "Scheme Output" consisting of a string of characters with a variable length or hexadecimal digits, dependent on the used protection scheme (PQC KEM, as discussed below). "Scheme Output" represents the output of a public key protection scheme. As shown in FIG. 3, the "Ciphertext value" in "Scheme Output" is PQC KEM ciphertext, which means that post quantum cryptography key encapsulation mechanism uses the PQC KEM public key of Home Network to generate the ciphertext.

Compared with the SUCI shown in FIGS. 1E and 1F, the newly defined SUCI type in FIG. 3 makes changes in the circled parts. In particular, the ECIES based parts "Home Network Public Key ID" and "Scheme Output" are changed to be based on PQC KEM. As shown in FIG. 3, three parts A, B and C included in "Scheme Output" are respectively "PQC KEM Ciphertext", "Ciphertext value" and "MAC tag value", wherein the "Ciphertext value" is formed with concealed SUPI, which is generated using PQC KEM according to some embodiments of the present disclosure.

Regarding the generation of the three parts A, B and C included in "Scheme Output", it will be described in detail in the following. Returning to FIG. 2, in some embodiments, the terminal device 110 may beforehand receive the public key from the network device 130. Alternatively, the terminal device 110 may beforehand receive the public key from another network device. Alternatively, the public key may be configured in the terminal device itself, for example, the public key has been written in the SIM card of the terminal device 110 by the mobile operator. It is to be understood that the terminal device 110 may use any other ways to obtain the public key, and the scope of the present disclosure is not limited in this regard. With the public key of the home network of the terminal device 110, the terminal device 110 may generate the SUCI.

In some embodiments, the terminal device 110 may generate the SUCI based on the public key through the following steps. First, the terminal device 110 may generate a first ciphertext and a first shared secret based on the public key. Second, the terminal device 110 may, based on the generated first shared secret, derive an encryption key using a key derivation function (KDF). Then, the terminal device 110 may generate a cipher text value and a message authentication code tag (MAC-tag) value based on the derived encryption key and the SUPI of the terminal device 110. And then, the terminal device 110 may generate the SUCI based on the generated first ciphertext, the generated cipher text value, and the generated MAC-tag value. In some embodiments, the first ciphertext is a PQC KEM ciphertext, and the first shared secret is a PQC KEM shared secret.

In some embodiments, a field of scheme output in the SUCI may comprise a first ciphertext, a cipher text value and a MAC-tag value. That is to say, with reference to FIG. 3, the terminal device 110 may take the generated PQC KEM ciphertext as being the circled A part, the generated cipher text value as being the circled B part, and the generated MAC-tag value as being the circled B part. The parts of A, B and C are included in "Scheme Output" of the SUCI.

In some embodiments, a field of home network public key ID in the SUCI may be used to identify the public key. That is to say, with reference to FIG. 3, the field of home network public key ID in the SUCI may be used to identify the PQC KEM public key which is associated with the PQC KEM private key. The PQC KEM public key and the PQC KEM private key are collectively referred to as PQC KEM key pair. Each UE is associated with a PQC KEM key pair which is beforehand generated. The generation of the PQC KEM key pair is generally performed by the network side, for example, by the network device 130. The public key is used by the terminal device 110, and the private key is used by the network device 130. In the case that the PQC KEM key pair is generated by the network device 130, it is provided to the terminal device 110 by the network device 130 beforehand. With the provisioned PQC KEM public key, the UE may encrypt the SUPI, and with the PQC KEM private key, the network device 130 may decrypt the received SUCI to obtain the SUPI of the terminal device 110, for example to authenticate the terminal device 110.

Regarding the generation of the PQC KEM key pair, it can be performed beforehand by any other devices. As discussed above, the terminal device 110 may receive the public key from the network side, or the public key may be configured in the terminal device.

In some embodiments, the terminal device 110 may use an authenticated encryption with associated data (AEAD) algorithm to generate the cipher text value and the MAC-tag value. For example, the derived encryption key and a plain text of the SUPI may be input into the AEAD algorithm to generate the cipher text value and the MAC-tag value. In some embodiments, the AEAD algorithm used by the terminal device 110 may comprise a function that achieves the properties of a Fujisaki-Okamoto (FO) transform or its variant, the HHK (Hofheinz, Hövelmanns, Kiltz) transform.

On the other hand, the network device 130 receives 206 the SUCI. In some embodiments, the network device 130 may obtain 208 the SUPI from the received SUCI through the following steps. First, the network device 130 may extract, from the received SUCI, the first ciphertext, the cipher text value and the MAC-tag value. In some embodiments, the first ciphertext is a PQC KEM ciphertext. As discussed above, the field of scheme output in the received SUCI may comprise a PQC KEM ciphertext, a cipher text value and a MAC-tag value (corresponding to respectively the parts of A, B and C with reference to FIG. 3). That is to say, the parts of A, B and C are included in "Scheme Output" of the received SUCI. The network device 130 may extract the circled A part as being the PQC KEM ciphertext, the circled B part as being the generated cipher text value, and the circled C part as being the generated MAC-tag value.

Second, the network device 130 may generate a first shared secret based on the extracted first ciphertext and the private key. In some embodiments, the first shared secret is a PQC KEM shared secret. Here, from the field of home network public key ID in the received SUCI which identifies the public key of the home network of the terminal device 110 which is associated with the private key, the network device 130 determines the private key corresponding to the terminal device 110, thereby performing the generating the PQC KEM shared secret. Then, the network device 130 may, based on the generated PQC KEM shared secret, derive a decryption key using a key derivation function (KDF). And then, the network device 130 may, based on the derived decryption key, verify the extracted MAC-tag value and decrypt the extracted cipher text value.

In some embodiments, the network device 130 may use (like the terminal device 110) an AEAD algorithm to verify the extracted MAC-tag value and decrypt the extracted cipher text value. In some embodiments, the network device 130 may verify the extracted MAC-tag value and decrypt the extracted cipher text value through the following steps. First, the network device 130 may input the derived encryption key and the extracted MAC-tag value into the AEAD algorithm to verify the extracted MAC-tag. Then, the network device 130 may, in response to the verifying is passed, input the derived encryption key and the extracted cipher text value into the AEAD algorithm to decrypt the extracted cipher text value.

In this way, the terminal device 110 generates the SUCI based on PQC KEM. According to some embodiments of the present disclosure, new fully post quantum based SUCI ensures to avoid different kinds of attacks, like Shor's algorithm attack on asymmetric cryptography methods based on prime factorization or discrete logarithm problem (finite field or elliptic curve).

In view of above, the solutions provided by some embodiments of the present disclosure have many advantages, for example, DOS attack on legitimate UEs can be addressed. In addition, replay attack can be avoided. Further, existing mechanism is reused in most extent, which may be easier to be accepted in the development of related technologies.

Figure 4:
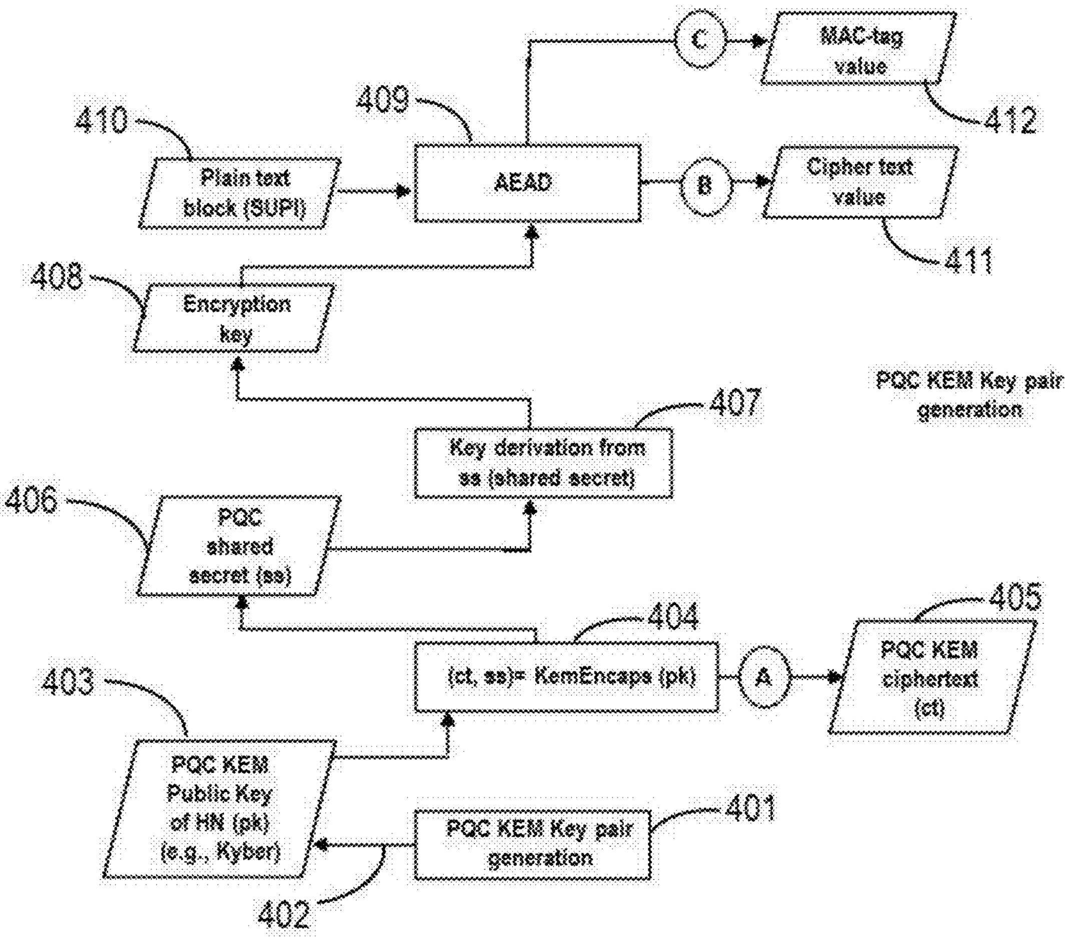
FIG. 4 illustrates an example schematic diagram of PQC key encapsulation to encrypt SUPI in UE side in accordance with some example embodiments of the present disclosure.

FIG. 4 illustrates an example schematic diagram of PQC key encapsulation to encrypt SUPI in UE side in accordance with some example embodiments of the present disclosure. As shown in FIG. 4, at 401, a PQC KEM key pair is generated for the UE by the network side. As discussed above, regarding the generation of the PQC KEM key pair, it can be performed by any network devices. The UE obtains 402 a PQC KEM public key of HN (pk) 403 which is the public key of the PQC KEM key pair. In some examples, the PQC KEM public key of HN (pk) 403 may be of Kyber. The UE may receive the PQC KEM public key of HN (pk) 403 from the network side. Alternatively, the PQC KEM public key 403 of HN (pk) 403 may be pre-configured in the terminal device.

At 404, the UE generates a PQC shared secret (ss) 406 and a PQC KEM ciphertext (ct) 405 based on the PQC KEM public key 403 of HN (pk) 403. The PQC KEM ciphertext (ct) 405 is taken as the A part shown in FIG. 3. At 407, based on the PQC shared secret (ss) 406, the UE derives an encryption key 408 using a key derivation function (KDF). At 409, the UE uses an AEAD algorithm to generate a cipher text value 411 and a MAC-tag value 412 based on the derived encryption key 408 and a plain text block (SUPI) 410 of the terminal device. The cipher text value 411 is taken as the B part shown in FIG. 3. The MAC-tag value 412 is taken as the C part shown in FIG. 3.

In view of above, in FIG. 4, at the UE side, the PQC KEM public key of Home Network (pk) 403 is used in key encapsulation mechanism (asymmetric cryptographic scheme) to generate the PQC KEM ciphertext (ct) 405 and PQC shared secret (ss) 406. The key derivation function is used to derive the encryption key 408. The encryption key 408 is fed into the AEAD algorithm along with the plain text (SUPI) 410 to generate the cipher text value 411 and the MAC-tag value 412. The final output contains the PQC KEM ciphertext (ct) 405 concatenated with the cipher text value 411 (the cipher text of SUPI) and MAC-tag value 412 (the MAC value of SUPI).

In this PQC based mode one needs to apply Fujisaki-Okamoto (FO) transform or its variant (HHK) on the PQC KEM part to ensure that the overall scheme is IND-CCA2 secure. The FO transform is performed using the KDF such that the PQC KEM shared secret achieved is IND-CCA2 secure. In this case, without the presence of ephemeral keys one can re-use the PQC KEM keys (but not recommended) depending on some upper bound level for the number of times the public PQC KEM public key can be re-used. The upper bound level will be defined on how many times the PQC KEM public key can be used, and the exact number need not be specified in the present disclosure.

In this way, the UE generates the SUCI based on PQC KEM. According to some embodiments of the present disclosure, new fully post quantum based SUCI ensures to avoid different kinds of attacks, like Shor's algorithm attack on asymmetric cryptography methods based on prime factorization or discrete logarithm problem (finite field or elliptic curve).

Figure 5:
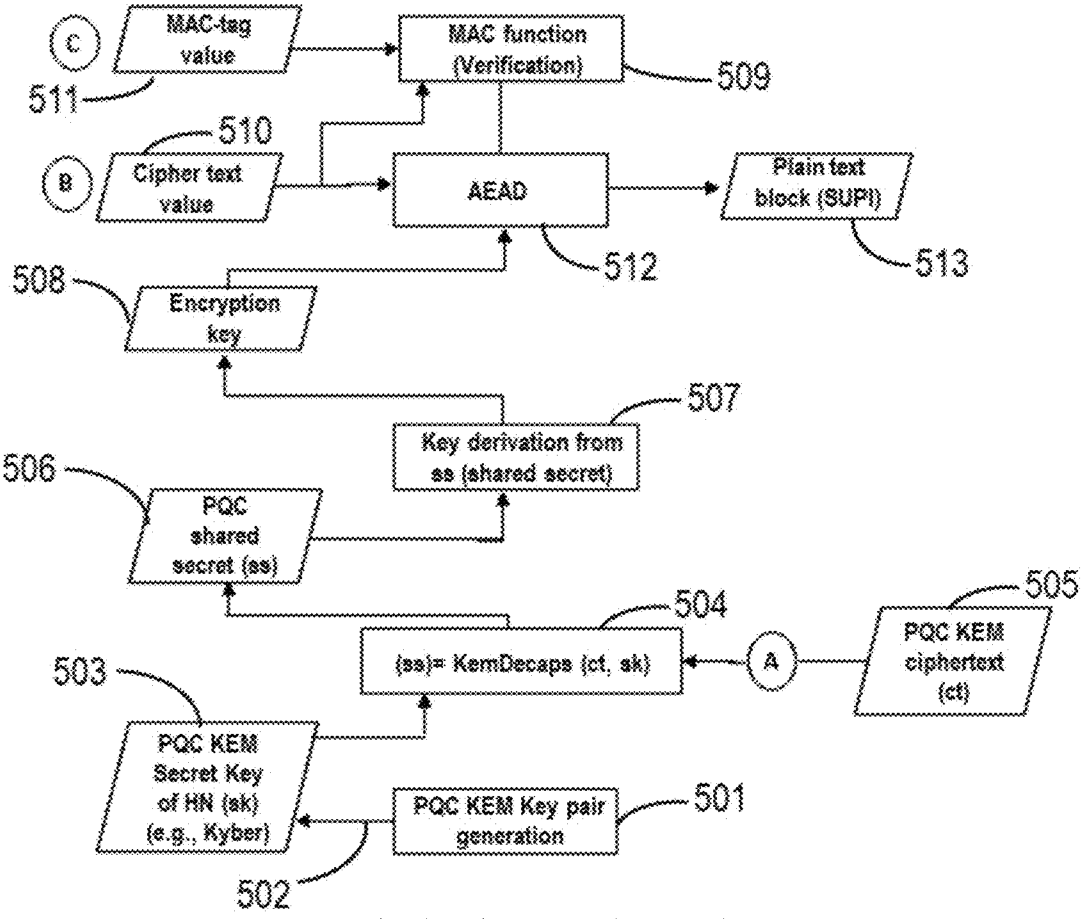
FIG. 5 illustrates an example schematic diagram of PQC key decapsulation to decrypt SUPI in network side (SIDF) in accordance with some example embodiments of the present disclosure.

FIG. 5 illustrates an example schematic diagram of PQC key decapsulation to decrypt SUPI in Network (SIDF) side in accordance with some example embodiments of the present disclosure. As shown in FIG. 5, at 501, a PQC KEM key pair is generated for the UE by the network side. As discussed above, regarding the generation of the PQC KEM key pair, it can be performed by any network devices. The SIDF obtains 502 the PQC KEM secret key of HN (sk) 503 which is the private key of the PQC KEM key pair. The PQC KEM secret key of HN (sk) 503 may also be referred as the private key or the PQC KEM private key (of HN).

At 504, the SIDF generates a PQC shared secret (ss) 506 based on a PQC KEM ciphertext (ct) 505 which is included in a received SUCI from a UE. The PQC KEM ciphertext (ct) 505 is the A part shown in FIG. 3. The SIDF extracts it from the received SUCI and then performs the generating the PQC shared secret (ss) 506. At 507, based on the PQC shared secret (ss) 506, the UE derives an encryption key 508 using a key derivation function (KDF).

At 509, the SIDF uses a MAC function to verify a MAC-tag value 511 included in the received SUCI (the C part shown in FIG. 3) based on a cipher text value 510 included in the received SUCI (the B part shown in FIG. 3). In response to passing the verifying, at 512, the SIDF uses an AEAD algorithm to decrypt a cipher text value 510 (the B part shown in FIG. 3) extracted from the received SUCI, to obtain a plain text block (SUPI) 513. It is noted that the AEAD algorithm is also used to verify the MAC-tag value 511.

In view of above, in FIG. 5, at the SIDF side, the received PQC KEM ciphertext (ct) 505 and the PQC KEM secret key of Home Network (sk) 503 are used as input parameters towards the Key encapsulation mechanism (KEM) to decapsulate and generate the PQC shared secret (ss) 506. The PQC shared secret (ss) 506 is further used as input parameter to the key derivation function to generate the decryption key 508. The decryption key 508 is fed into the AEAD algorithm to decipher the SUCI to SUPI. Also, the AEAD algorithm is used to verify the MAC value. It is noted that the SIDF can use the Home Network public key id (PQC KEM ID) to identify the PQC KEM secret of HN for decapsulation mechanism.

In this way, new fully post quantum based SUCI ensures to avoid different kinds of attacks, like Shor's algorithm attack on asymmetric cryptography methods based on prime factorization or discrete logarithm problem (finite field or elliptic curve).

Figure 6:
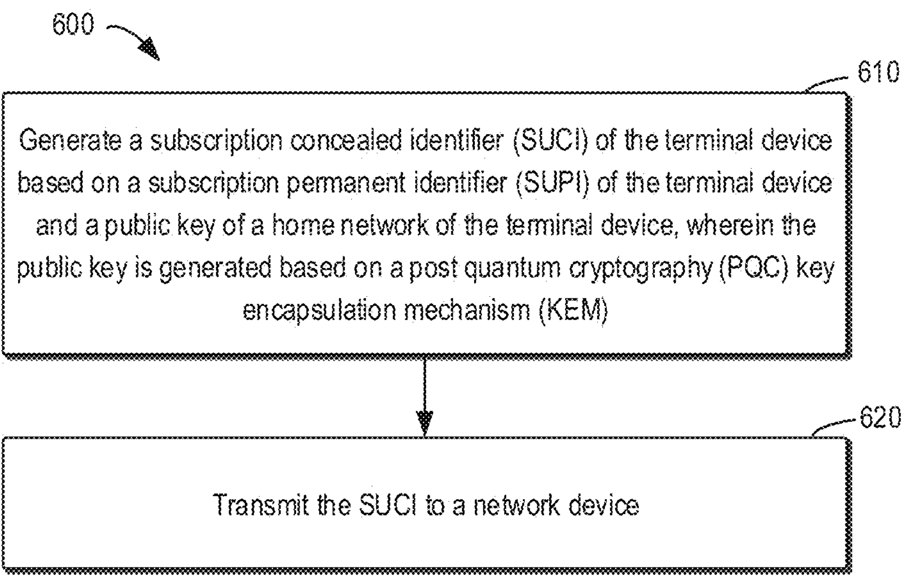
FIG. 6 illustrates a flowchart of an example method implemented at an terminal device in accordance with some embodiments of the present disclosure.

FIG. 6 illustrates a flowchart of an example method 600 implemented at a terminal device (e.g. the terminal device 110) in accordance with some embodiments of the present disclosure. For the purpose of discussion, the method 600 will be described from the perspective of the terminal device 110 with reference to FIGS. 1A and 2.

At block 610, the terminal device generates a subscription concealed identifier (SUCI) of the terminal device based on a subscription permanent identifier (SUPI) of the terminal device and a public key of a home network of the terminal device, wherein the public key is generated based on a post quantum cryptography (PQC) key encapsulation mechanism (KEM). At block 620, the terminal device transmits the SUCI to a network device.

In some embodiments, in order to generate the SUCI, the terminal device may receive the public key from the network device or from another network device or obtaining the public key configured in the terminal device itself. Then, the terminal device can generate the SUCI based on the received public key.

In some embodiments, in order to generate the SUCI based on the public key, the terminal device may generate a first ciphertext and a first shared secret based on the public key. Then, the terminal device may, based on the generated first shared secret, derive an encryption key using a key derivation function (KDF). Then, the terminal device may generate a cipher text value and a message authentication code tag (MAC-tag) value based on the derived encryption key and the SUPI of the terminal device. And then, the terminal device may generate the SUCI based on the generated first ciphertext, the generated cipher text value, and the generated MAC-tag value.

In some embodiments, the terminal device may use an authenticated encryption with associated data (AEAD) algorithm to generate the cipher text value and the MAC-tag value. In some embodiments, in order to generate the cipher text value and the MAC-tag value, the terminal device may input the derived encryption key and a plain text of the SUPI into the AEAD algorithm to generate the cipher text value and the MAC-tag value.

In some embodiments, a field of home network public key ID in the SUCI may be used to identify the public key. In some embodiments, a field of scheme output in the SUCI may comprise a first ciphertext, a cipher text value and a MAC-tag value, and the first ciphertext, the cipher text value and the MAC-tag value are generated by the terminal device based on the public key. In some embodiments, the first ciphertext may be a PQC KEM ciphertext, and the first shared secret may be a PQC KEM shared secret. In some embodiments, the KDF may comprise a function that achieves the properties of a Fujisaki-Okamoto (FO) transform or of a HHK transform.

Figure 7:
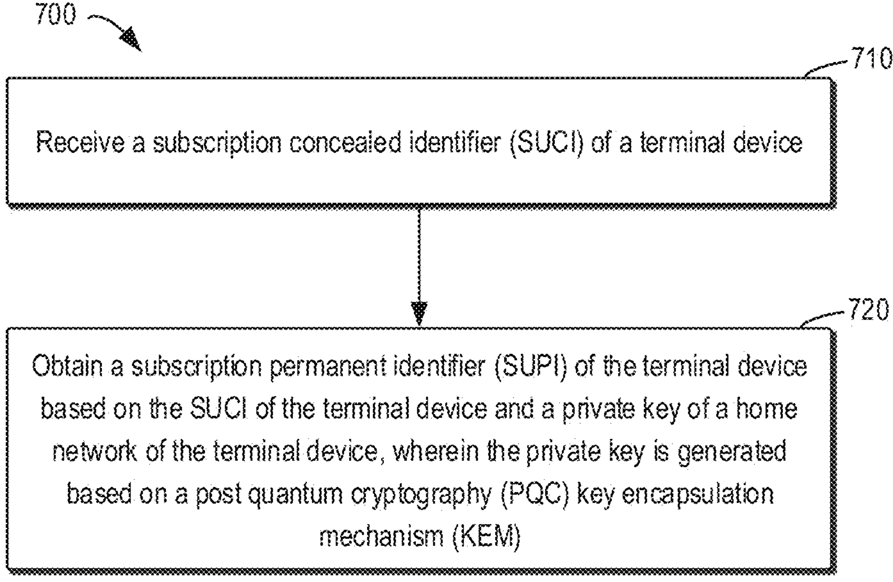
FIG. 7 illustrates another flowchart of an example method implemented at a network device in accordance with some embodiments of the present disclosure.

FIG. 7 illustrates another flowchart of an example method 700 implemented at a network device (e.g. the network device 130) in accordance with some other embodiments of the present disclosure. For the purpose of discussion, the method 700 will be described from the perspective of the access network device 130 with reference to FIGS. 1A and 2.

At block 710, the network device receives a subscription concealed identifier (SUCI) of a terminal device. At block 720, the network device obtains a subscription permanent identifier (SUPI) of the terminal device based on the SUCI of the terminal device and a private key of a home network of the terminal device, wherein the private key is generated based on a post quantum cryptography (PQC) key encapsulation mechanism (KEM).

In some embodiments, the network device may further generate a PQC KEM pair for the terminal device and transmit a public key of the generated PQC KEM pair to the terminal device, the public key of the generated PQC KEM pair being associated with the private key. In some embodiments, in order to obtain the SUPI, the network device may extracted, from the SUCI, a first ciphertext, a cipher text value and a message authentication code tag (MAC-tag) value. Then, the network device may generate a first shared secret based on the extracted first ciphertext and the private key. Then, the network device may, based on the generated first shared secret, derive a decryption key using a key derivation function (KDF). And then, the network device may, based on the derived decryption key, verify the extracted MAC-tag value and decrypting the extracted cipher text value.

In some embodiments, the network device may use an authenticated encryption with associated data (AEAD) algorithm to verify the extracted MAC-tag value and decrypt the extracted cipher text value. In some embodiments, in order to verify the extracted MAC-tag value and decrypt the extracted cipher text value, the network device may input the derived encryption key and the extracted MAC-tag value into the AEAD algorithm to verify the extracted MAC-tag. In response to the verifying is passed, the network device may input the derived encryption key and the extracted cipher text value into the AEAD algorithm to decrypt the extracted cipher text value.

In some embodiments, a field of home network public key ID in the received SUCI may identify a public key of a home network of the terminal device which is associated with the private key. In some embodiments, the first ciphertext, the cipher text value and the message authentication code tag (MAC-tag) value may be extracted from a field of scheme output in the received SUCI. In some embodiments, the first ciphertext may be a PQC KEM ciphertext, and the first shared secret may be a PQC KEM shared secret. In some embodiments, the KDF may comprise a function that achieves the properties of a Fujisaki-Okamoto (FO) transform or of a HHK transform.

In some embodiments, the network device may reside at a unified data management (UDM) network function or an authentication server function, AUSF, or any other future network function in the core network.

In some embodiments, an apparatus capable of performing the method 600 (for example, the terminal device 110) may comprise means for performing the respective steps of the method 600. The means may be implemented in any suitable form. For example, the means may be implemented in a circuitry or software module.

In some example embodiments, the apparatus comprises: means for generating, at a terminal device, a subscription concealed identifier (SUCI) of the terminal device based on a subscription permanent identifier (SUPI) of the terminal device and a public key of a home network of the terminal device, wherein the public key is generated based on a post quantum cryptography (PQC) key encapsulation mechanism (KEM); and means for transmitting the SUCI to a network device.

In some embodiments, the means for generating the SUCI may comprise: means for receiving the public key from the network device or from another network device or means for obtaining the public key configured in the terminal device itself; and means for generating the SUCI based on the received public key.

In some embodiments, the means for generating the SUCI may comprise: means for generating a first ciphertext and a first shared secret based on the public key; means for, based on the generated first shared secret, deriving an encryption key using a key derivation function (KDF); means for generating a cipher text value and a message authentication code tag (MAC-tag) value based on the derived encryption key and the SUPI of the terminal device; and means for generating the SUCI based on the generated first ciphertext, the generated cipher text value, and the generated MAC-tag value.

In some embodiments, an authenticated encryption with associated data (AEAD) algorithm may be used to generate the cipher text value and the MAC-tag value.

In some embodiments, the cipher text value and the MAC-tag value may be generated by: inputting the derived encryption key and a plain text of the SUPI into the AEAD algorithm to generate the cipher text value and the MAC-tag value.

In some embodiments, a field of home network public key ID in the SUCI may be used to identify the public key.

In some embodiments, a field of scheme output in the SUCI may comprise a first ciphertext, a cipher text value and a MAC-tag value, and the first ciphertext, the cipher text value and the MAC-tag value are generated by the terminal device based on the public key.

In some embodiments, the first ciphertext may be a PQC KEM ciphertext, and the first shared secret may be a PQC KEM shared secret.

In some embodiments, the KDF may comprise a function that achieves the properties of a Fujisaki-Okamoto (FO) transform or of a HHK transform.

In some embodiments, the apparatus further comprises means for performing other steps in some embodiments of the method 600. In some embodiments, the means comprises at least one processor and at least one memory including computer program code, the at least one memory and computer program code configured to, with the at least one processor, cause the performance of the apparatus.

In some embodiments, an apparatus capable of performing the method 700 (for example, the network device 130) may comprise means for performing the respective steps of the method 700. The means may be implemented in any suitable form. For example, the means may be implemented in a circuitry or software module.

In some example embodiments, the apparatus comprises: means for receiving, at a network device, a subscription concealed identifier (SUCI) of a terminal device; and means for obtaining a subscription permanent identifier (SUPI) of the terminal device based on the SUCI of the terminal device and a private key of a home network of the terminal device, wherein the private key is generated based on a post quantum cryptography (PQC) key encapsulation mechanism (KEM).

In some embodiments, the apparatus may further comprises: means for generating a PQC KEM pair for the terminal device and means for transmitting a public key of the generated PQC KEM pair to the terminal device, the public key of the generated PQC KEM pair being associated with the private key.

In some embodiments, the means for obtaining the SUPI may comprise: means for extracting, from the SUCI, a first ciphertext, a cipher text value and a message authentication code tag (MAC-tag) value; means for generating a first shared secret based on the extracted first ciphertext and the private key; means for, based on the generated first shared secret, deriving an decryption key using a key derivation function (KDF); and means for, based on the derived decryption key, verifying the extracted MAC-tag value and decrypting the extracted cipher text value.

In some embodiments, an authenticated encryption with associated data (AEAD) algorithm may be used to verify the extracted MAC-tag value and decrypt the extracted cipher text value.

In some embodiments, the extracted MAC-tag value may be verified and the extracted cipher text value may be decrypted by: inputting the derived encryption key and the extracted MAC-tag value into the AEAD algorithm to verify the extracted MAC-tag; and in response to the verifying is passed, inputting the derived encryption key and the extracted cipher text value into the AEAD algorithm to decrypt the extracted cipher text value.

In some embodiments, a field of home network public key ID in the received SUCI may identify a public key of a home network of the terminal device which is associated with the private key.

In some embodiments, the first ciphertext, the cipher text value and the message authentication code tag (MAC-tag) value may be extracted from a field of scheme output in the received SUCI.

In some embodiments, the first ciphertext may be a PQC KEM ciphertext, and the first shared secret may be a PQC KEM shared secret.

In some embodiments, the KDF may comprise a function that achieves the properties of a Fujisaki-Okamoto (FO) transform or of a HHK transform.

In some embodiments, the apparatus further comprises means for performing other steps in some embodiments of the method 700. In some embodiments, the means comprises at least one processor and at least one memory including computer program code, the at least one memory and computer program code configured to, with the at least one processor, cause the performance of the apparatus.

Figure 8:
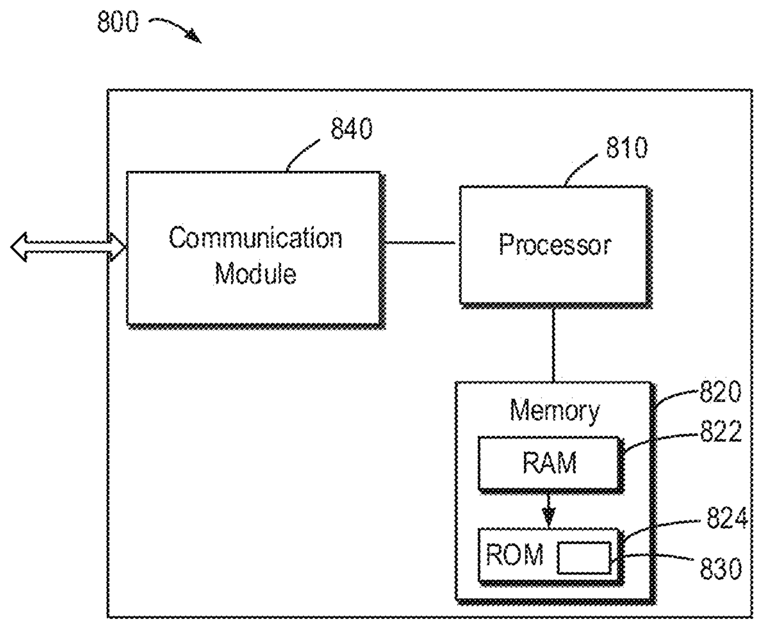
FIG. 8 illustrates a simplified block diagram of a device that is suitable for implementing some example embodiments of the present disclosure.

FIG. 8 illustrates a simplified block diagram of a device 800 that is suitable for implementing some example embodiments of the present disclosure. The device 800 may be provided to implement a communication device, for example, the terminal device 110, the network device 130 as shown in FIGS. 1A and 2. As shown, the device 800 includes one or more processors 810, one or more memories 820 coupled to the processor 810, and one or more communication modules 840 coupled to the processor 810.

The communication module 840 is for bidirectional communications. The communication module 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 824. The processor 810 may perform any suitable actions and processing by loading the program 830 into the RAM 822.

The embodiments of the present disclosure may be implemented by means of the program 830 so that the device 800 may perform any process of the disclosure as discussed with reference to FIG. 2. The embodiments of the present disclosure may also be implemented by hardware or by a combination of software and hardware.

In some example embodiments, the program 830 may be tangibly contained in a computer-readable medium which may be included in the device 800 (such as in the memory 820) or other storage devices that are accessible by the device 800. The device 800 may load the program 830 from the computer-readable medium to the RAM 822 for execution. The computer-readable medium may include any types of tangible non-volatile storage, such as ROM, EPROM, a flash memory, a hard disk, CD, DVD, and the like.

FIG. 9 illustrates a block diagram of an example of a computer-readable medium 900 in accordance with some example embodiments of the present disclosure. The computer-readable medium 900 has the program 830 stored thereon. It is noted that although the computer-readable medium 900 is depicted in form of CD or DVD in FIG. 9, the computer-readable medium 900 may be in any other form suitable for carry or hold the program 830.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer-readable storage medium. The computer program product includes computer-executable instructions, such as those included in program modules, being executed in a device on a target real or virtual processor, to carry out the method 600 or 700 as described above with reference to FIG. 6 or 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer-readable medium, and the like.

The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

The invention claimed is:

1. A terminal device comprising:

at least one processor; and at least one memory storing instructions that, when executed by the at least one processor, cause the terminal device at least to:

generate a subscription concealed identifier (SUCI) of the terminal device based on a subscription permanent identifier (SUPI) of the terminal device and a public key of a home network of the terminal device, wherein the public key is generated based on a post quantum cryptography (PQC) key encapsulation mechanism (KEM), and wherein the SUCI is generated by receiving the public key from a network device or from another network device; and transmit the SUCI to the network device, wherein the terminal device is caused to generate the SUCI based on the public key by:

generating a first ciphertext and a first shared secret based on the public key;

based on the generated first shared secret, deriving an encryption key using a key derivation function (KDF);

generating a cipher text value and a message authentication code tag (MAC-tag) value based on the derived encryption key and the SUPI of the terminal device; and generating the SUCI based on the generated first ciphertext, the generated cipher text value, and the generated MAC-tag value.

2. The terminal device of claim 1, wherein the terminal device is caused to generate the SUCI based on the received public key.

3. The terminal device of claim 1, wherein the terminal device is caused to use an authenticated encryption with associated data (AEAD) algorithm to generate the cipher text value and the MAC-tag value.

4. The terminal device of claim 3, wherein the terminal device is caused to generate the cipher text value and the MAC-tag value by:

inputting the derived encryption key and a plain text of the SUPI into the AEAD algorithm to generate the cipher text value and the MAC-tag value.

5. The terminal device of claim 1, wherein a field of home network public key ID on the SUCI is used to identify the public key.

6. The terminal device of claim 1, wherein:

a field of scheme output in the SUCI comprises a first ciphertext, a cipher text value and a MAC-tag value, and the first ciphertext, the cipher text value and the MAC-tag value are generated by the terminal device based on the public key.

7. The terminal device of claim 1, wherein the first ciphertext is a PQC KEM ciphertext, and the first shared secret is a PQC KEM shared secret.

8. The terminal device of claim 1, wherein the KDF comprises a function that achieves the properties of a Fujisaki-Okamoto (FO) transform or of a Hofheinz, Hovelmanns, Kiltz (HHK) transform.

* * * * *